(12) United States Patent
Horiuchi

(10) Patent No.: US 8,658,898 B2
(45) Date of Patent: Feb. 25, 2014

(54) RESIN COMPOSITION FOR HEAT-RESISTANT ELECTRICAL WIRE, AND HEAT-RESISTANT ELECTRICAL WIRE

(75) Inventor: Yuki Horiuchi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 345 days.

(21) Appl. No.: 13/254,051

(22) PCT Filed: Apr. 13, 2010

(86) PCT No.: PCT/JP2010/056611
§ 371 (c)(1),
(2), (4) Date: Aug. 31, 2011

(87) PCT Pub. No.: WO2010/119871
PCT Pub. Date: Oct. 21, 2010

(65) Prior Publication Data
US 2011/0315425 A1    Dec. 29, 2011

(30) Foreign Application Priority Data

Apr. 13, 2009  (JP) .................................. 2009-096808
Feb. 19, 2010  (JP) .................................. 2010-034618

(51) Int. Cl.
*H01B 7/00*   (2006.01)

(52) U.S. Cl.
USPC ............. 174/110 R; 174/120 R; 174/120 SR; 524/266; 524/267; 524/268

(58) Field of Classification Search
USPC .. 174/110 R, 110 SR, 110 N, 110 FC, 110 E, 174/120 R, 120 SR, 126.1, 126.2, 126.3; 524/266–268
See application file for complete search history.

(56) References Cited

U.S. PATENT DOCUMENTS

| | | | | |
|---|---|---|---|---|
| 5,872,187 | A  * | 2/1999  | Takatani et al. ................ | 525/133 |
| 6,136,901 | A  * | 10/2000 | Hashitani et al. .............. | 524/109 |
| 6,258,881 | B1 * | 7/2001  | Moritomi ........................ | 524/267 |
| 6,340,721 | B1 * | 1/2002  | Hashitani et al. .............. | 524/109 |
| 7,524,894 | B2   | 4/2009  | Sato et al. | |
| 2004/0039128 | A1 * | 2/2004 | Sasagawa et al. ........... | 525/331.9 |
| 2005/0119414 | A1 * | 6/2005 | Sasagawa et al. ............. | 525/242 |
| 2006/0178485 | A1 * | 8/2006 | Shimakage et al. .......... | 525/242 |
| 2008/0176978 | A1 * | 7/2008 | Nodera .......................... | 524/114 |
| 2008/0188580 | A1 * | 8/2008 | Sasagawa et al. ............. | 521/150 |
| 2008/0194716 | A1 * | 8/2008 | Sasagawa et al. ............. | 521/139 |
| 2009/0124730 | A1 * | 5/2009 | Matsuda et al. ................ | 524/71 |

FOREIGN PATENT DOCUMENTS

| | | |
|---|---|---|
| JP | 11-189686 A | 7/1999 |
| JP | 2003-253066 A | 9/2003 |
| JP | 2004-071397 A | 3/2004 |
| JP | 2004-161929 A | 6/2004 |
| JP | 2008-524803 A | 7/2008 |
| WO | 2006/065502 A1 | 6/2006 |

OTHER PUBLICATIONS

International Search Report for PCT/JP2010/056611 dated Jul. 13, 2010 [PCT/ISA/210].

* cited by examiner

*Primary Examiner* — William H Mayo, III
(74) *Attorney, Agent, or Firm* — Sughrue Mion, PLLC

(57) ABSTRACT

A resin composition for heat-resistant electrical wires is configured of 100 parts by weight of base resin ingredients and 5-20 parts by weight of a phosphorus-based flame retardant, the base resin ingredients comprising 30-55 parts by weight of a polymer having a glass transition temperature or melting point of 180° C. or higher, 15-49 parts by weight of polyolefin, and 21-30 parts by weight of a styrene-based elastomer ingredient, the styrene-based elastomer ingredient having a content of the styrene unit represented by chemical formula (I) of 30% by weight or less.

[Chem. 1]

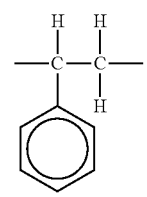

(I)

6 Claims, No Drawings

RESIN COMPOSITION FOR HEAT-RESISTANT ELECTRICAL WIRE, AND HEAT-RESISTANT ELECTRICAL WIRE

TECHNICAL FIELD

The present invention relates to a resin composition for heat-resistant electrical wires usable also in motor vehicles.

BACKGROUND ART

Bromine-based flame retardants, antimony trioxide, and the like have been used in large quantities in insulator materials for conventional heat-resistant low-voltage electrical wires for motor vehicles. However, such insulator materials release toxic gases, e.g., halogen gases, during a vehicle fire or incineration disposal to pose an environmental problem. Furthermore, sufficient heat resistance is obtained only when the covering layer formed by extrusion molding is crosslinked by irradiation with electron beams. Production of the conventional heat-resistant electrical wires requires an expensive electron beam irradiator and necessitates an electron beam irradiation step, resulting in low productivity.

Under these circumstances, a non-crosslinking type resin composition for heat-resistant electrical wires has been developed in recent years. This resin composition includes a poly(phenylene ether) material which has excellent heat resistance and attains high flame retardancy even in case of halogen-free, i.e., having no halogen (patent document 1).

A technique in which a styrene-based elastomer is incorporated as a compatibilizing agent for polypropylene and poly(phenylene ether) is disclosed (patent document 2).

PRIOR-ART DOCUMENTS

Patent Documents

Patent Document 1: JP-A-11-189686
Patent Document 2: JP-A-2004-161929

SUMMARY OF THE INVENTION

Problems that the Invention is to Solve

However, those resin compositions have had a problem that the electrical wires produced therewith satisfy neither resistance to 10,000-hour heat aging at 125° C. nor 10,000-hour compatibility with PVC at 100° C.

Furthermore, the covering layers have too high hardness and the electrical wires have poor flexibility. There has hence been a problem, for example, that these electrical wires, when used as automotive electrical wires, have poor applicability to motor vehicles.

An object of the invention is to provide a resin composition for heat-resistant electrical wires which mitigates those problems of the prior-art techniques, i.e., which has high heat resistance and flame retardancy and combines excellent heat aging resistance and compatibility with PVC.

Means for Solving the Problems (1) The invention provides, in order to overcome the problems described above, a resin composition for heat-resistant electrical wires which is characterized by being configured of 100 parts by weight of base resin ingredients and 5-20 parts by weight of a phosphorus-based flame retardant, the base resin ingredients comprising 30-55 parts by weight of a polymer having a glass transition temperature or melting point of 180° C. or higher, 15-49 parts by weight of a polyolefin, and 21-30 parts by weight of a styrene-based elastomer ingredient, the styrene-based elastomer ingredient having a content of the styrene unit represented by chemical formula (I) of 30% by weight or less.

[Chem. 1]

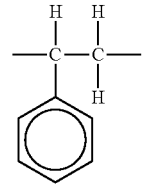

(I)

(2) It is preferred that the resin composition for heat-resistant electrical wires of the invention should be the resin composition for heat-resistant electrical wires according to (1) above wherein the polymer having a glass transition temperature or melting point of 180° C. or higher is poly(phenylene ether).

(3) It is preferred that the resin composition for heat-resistant electrical wires of the invention should be the resin composition for heat-resistant electrical wires according to (1) or (2) above wherein the polyolefin is a polypropylene-based polymer having a tensile modulus of 1,000 MPa or more.

(4) It is preferred that the resin composition for heat-resistant electrical wires of the invention should be the resin composition for heat-resistant electrical wires according to any one of (1) to (3) above wherein the phosphorus-based flame retardant is a polyphosphoric acid salt.

(5) Furthermore, it is preferred that the resin composition for heat-resistant electrical wires of the invention should be the resin composition for heat-resistant electrical wires according to any one of (1) to (4) above wherein the styrene-based elastomer ingredient is configured of a first styrene-based elastomer and a second styrene-based elastomer, the first styrene-based elastomer having a content of the styrene unit represented by chemical formula (I) of 13% by weight or less and the second styrene-based elastomer having a content of the styrene unit represented by chemical formula (I) of 29-43% by weight.

(6) The invention provides a heat-resistant electrical wire characterized by including a covering layer formed from the resin composition for heat-resistant electrical wires according to any one of (1) to (5) above.

Effects of the Invention

The resin composition for heat-resistant electrical wires of the invention is a resin composition for heat-resistant electrical wires which has high heat resistance and flame retardancy and combines excellent heat aging resistance and compatibility with PVC, and which is excellent also in terms of unsusceptibility to high-temperature melting, hot-water resistance, oil resistance, flexibility, and wear resistance.

MODES FOR CARRYING OUT THE INVENTION

Examples of the polymer having a glass transition temperature or melting point of 180° C. or higher in the invention include poly(phenylene ether), poly(phenylene sulfide), polyimide resins, polycarbonates, and thermoplastic polyester resins. Poly(phenylene ether) (available from Mitsubishi Engineering-Plastics Corp., etc.) is preferred of these because this polymer has satisfactory flame retardancy.

The expression "having a glass transition temperature or melting point of 180° C. or higher" means that the polymer may be any polymer which has either a glass transition temperature of 180° C. or higher or a melting point of 180° C. or higher. A polymer which has no clear melting point may be used so long as this polymer has a glass transition temperature of 180° C. or higher.

Such a polymer having a glass transition temperature or melting point of 180° C. or higher is incorporated so that the amount thereof in 100 parts by weight of the base resin ingredients is 30-55 parts by weight. In the case where the amount of the polymer incorporated is less than 30 parts by weight, flame retardancy and unsusceptibility to high-temperature melting are insufficient. In the case where the polymer is incorporated in an amount exceeding 55 parts by weight, oil resistance and heat aging resistance are insufficient.

Examples of the polyolefin in the invention include polypropylene-based polymers and polyethylene-based polymers. Polypropylene-based polymers are preferred of these because of the high melting points thereof. Especially preferred of the polypropylene-based polymers are homopolymers because the homopolymers have satisfactory wear resistance.

It is more preferred that the polyolefin should be a polypropylene-based polymer having a tensile modulus of 1,000 MPa or more because higher wear resistance is obtained therewith.

Such a polyolefin is incorporated so that the amount thereof in 100 parts by weight of the base resin ingredients is 15-49 parts by weight. In the case where the amount of the polyolefin incorporated is less than 15 parts by weight, oil resistance and heat aging resistance are insufficient. In the case where a polyolefin is incorporated in an amount exceeding 49 parts by weight, flame retardancy, unsusceptibility to high-temperature melting, and the like are insufficient.

The styrene-based elastomer ingredient in the invention is constituted of one or more styrene-based elastomers, and it is necessary that this styrene-based elastomer ingredient should have a content of the styrene unit represented by chemical formula (I) of 30% by weight or less. In the case where the content of the styrene unit exceeds 30% by weight, heat aging resistance and flexibility are not sufficiently obtained. Values of the content of the styrene unit in the styrene-based elastomer are determined by carbon nuclear magnetic resonance analysis.

[Chem. 2]

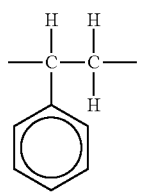

(I)

It is more preferred that the styrene-based elastomers which constitute the styrene-based elastomer ingredient should be configured of a first styrene-based elastomer, which has a content of the styrene unit represented by chemical formula (I) of 13% by weight or less, and a second styrene-based elastomer, which has a content of the styrene unit represented by chemical formula (I) of 29-43% by weight. This is because this styrene-based elastomer ingredient makes it possible to attain both higher wear resistance and flexibility.

In this case, it is preferred that the first styrene-based elastomer and second styrene-based elastomer for the styrene-based elastomer ingredient should be blended in such a proportion that the styrene-based elastomer ingredient to be configured satisfies the content of the styrene unit represented by chemical formula (I) of 30% by weight or less and that the proportion is in the range of 1:4 to 4:1 in terms of weight ratio (including the boundary values).

Examples of the styrene-based elastomers usable in the invention include styrene/butadiene/styrene copolymers, styrene/butadiene/butylene/styrene copolymers, styrene/ethylene/butylene/styrene copolymers, styrene/ethylene/propylene copolymers, styrene/ethylene/propylene/styrene copolymers, and styrene/ethylene/ethylene/propylene/styrene copolymers. Preferred of these are styrene/ethylene/butylene/styrene copolymers (available from Asahi Kasei Chemicals Corp., etc.), which are completely hydrogenated styrene-based elastomers, because of the satisfactory heat resistance thereof. Incidentally, the styrene-based elastomers which are currently on the market each have a styrene unit content of 12% by weight or more.

Such a styrene-based elastomer ingredient is incorporated so that the amount thereof in 100 parts by weight of the base resin ingredients is 21-30 parts by weight. In the case where the amount of the elastomer ingredient incorporated is less than 21 parts by weight, heat aging resistance, compatibility with PVC, flexibility, and the like are insufficient. In the case where a styrene-based elastomer ingredient is incorporated in an amount exceeding 30 parts by weight, oil resistance, wear resistance, and the like are insufficient. It is preferred that the amount thereof should be 23-28 parts by weight because heat aging resistance, compatibility with PVC, and flexibility are balanced with oil resistance and wear resistance.

Besides 100 part by weight of the base resin ingredients, a phosphorus-based flame retardant is incorporated in an amount of 5-20 parts by weight into the resin composition for heat-resistant electrical wires of the invention. When the amount of the phosphorus-based flame retardant is 15 parts by weight or less, satisfactory hot-water resistance is obtained. Examples of the phosphorus-based flame retardant include polyphosphoric acid salts, phosphoric acid esters, and red phosphorus. Preferred of these are polyphosphoric acid salts (available from Ciba Japan K.K., etc.) because high unsusceptibility to high-temperature melting is obtained therewith.

In the case where this phosphorus-based flame retardant is incorporated in an amount less than 5 parts by weight per 100 parts by weight of the base resin ingredients, flame retardancy and the like are not sufficiently obtained. On the other hand, in the case where the amount thereof exceeds 20 parts by weight, hot-water resistance and the like are not sufficiently obtained.

Besides the essential ingredients described above, the following ingredients may have been incorporated into the resin composition for heat-resistant electrical wires of the invention unless the incorporation thereof lessens the effects of the invention. Examples of usable ingredients include antioxidants, metal deactivators, other aging inhibitors, lubricants, fillers and reinforcements, UV absorbers, stabilizers, plasticizers, pigments, dyes, colorants, antistatic agents, and blowing agents.

The resin composition for heat-resistant electrical wires of the invention may be produced in the following manner. The base resin ingredients alone are kneaded with a kneader, roll mixer, Banbury mixer, twin-screw extruder, or the like to obtain a base resin. Thereafter, a phosphorus-based flame retardant and other additives are added to the base resin, and kneading is conducted again. Alternatively, use may be made of a method in which a phosphorus-based flame retardant and other additives are added and kneaded simultaneously with the mixing of the base resin ingredients.

The resin composition for heat-resistant electrical wires of the invention thus obtained can be used to form a covering layer of an electrical wire by extrusion molding in the same manner as for general resin compositions for electrical wires. After the molding, the covering layer does not require the step of crosslinking by irradiation with electron beams or the like.

EXAMPLES

Examples of the resin composition for heat-resistant electrical wires of the invention are described below.
<Preparation of Resin Compositions for Heat-Resistant Electrical Wires>
Using the starting materials shown in Table 1, resin compositions for heat-resistant electrical wires were prepared by means of a twin-screw extruder in accordance with the formulations (parts by weight) shown in Table 2 and Table 3.

TABLE 1

| | | |
|---|---|---|
| Polypropylene-based resin A | tensile modulus, 1050 MPa | B221WA, manufactured by Prime Polymer Co., Ltd. |
| Polypropylene-based resin B | tensile modulus, 950 MPa | J232WA, manufactured by Prime Polymer Co., Ltd. |
| Poly(phenylene ether) C | | PX-100L, manufactured by Mitsubishi Engineering-Plastics Corp. |
| Poly(phenylene sulfide) D | | RYTON PR34, manufactured by Chevron Phillips Company |
| Styrene-based elastomer E | styrene unit, 12 wt % | Tuftec H1221, manufactured by Asahi Kasei Chemicals Corp. |
| Styrene-based elastomer F | styrene unit, 13 wt % | Septon 2063, manufactured by Kuraray Co., Ltd. |
| Styrene-based elastomer G | styrene unit, 18 wt % | Septon 2004, manufactured by Kuraray Co., Ltd. |
| Styrene-based elastomer H | styrene unit, 29 wt % | Tuftec H1053, manufactured by Asahi Kasei Chemicals Corp. |
| Styrene-based elastomer I | styrene unit, 30 wt % | Septon 8007, manufactured by Kuraray Co., Ltd. |
| Styrene-based elastomer J | styrene unit, 42 wt % | Tuftec H1051, manufactured by Asahi Kasei Chemicals Corp. |
| Styrene-based elastomer K | styrene unit, 43 wt % | Tuftec L517, manufactured by Asahi Kasei Chemicals Corp. |
| Styrene-based elastomer L | styrene unit, 67 wt % | Tuftec H1043, manufactured by Asahi Kasei Chemicals Corp. |
| Phosphorus-based flame retardant M | melamine polyphosphate | MELAPUR200/70, manufactured by Ciba Japan K.K. |
| Phosphorus-based flame retardant N | phosphoric ester | PX-200, manufactured by Daihachi Chemical Industry Co., Ltd. |

TABLE 2

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Polypropylene-based resin A | 49 | 15 | 25 | 40 | 35 | 35 | 30 | | 30 | 30 | 30 |
| Polypropylene-based resin B | | | | | | | | 30 | | | |
| Poly(phenylene ether) C | 30 | 55 | 50 | 35 | 40 | | 45 | 45 | 45 | 45 | 45 |
| Poly(phenylene sulfide) D | | | | | | 40 | | | | | |
| Styrene-based elastomer E | 21 | 30 | | 25 | | 25 | 25 | 25 | 13 | 13 | |
| Styrene-based elastomer F | | | | | | | | | | | 13 |
| Styrene-based elastomer G | | | 25 | | | | | | | | |
| Styrene-based elastomer H | | | | | | | | | | | 12 |
| Styrene-based elastomer I | | | | | 25 | | | | | | |
| Styrene-based elastomer J | | | | | | | | | 12 | | |
| Styrene-based elastomer K | | | | | | | | | | 12 | |
| Styrene-based elastomer L | | | | | | | | | | | |
| Phosphorus-based flame retardant M | 15 | 10 | 5 | 20 | 10 | 15 | | 15 | 15 | 15 | 15 |
| Phosphorus-based flame retardant N | | | | | | | 10 | | | | |
| Property Heat aging resistance | A | A | A | A | B | A | A | A | A | A | A |
| Compatibility with PVC | B | B | B | B | B | B | B | B | B | B | B |
| Flame retardancy | B | B | B | B | B | B | B | B | B | B | B |
| Unsusceptibility to high-temperature melting | A | A | A | A | A | A | B | A | A | A | A |
| Hot-water resistance | B | B | B | B | B | B | B | B | B | B | B |
| Oil resistance | B | B | B | B | B | B | B | B | B | B | B |
| Flexibility | A | A | A | B | B | B | A | A | A | A | A |
| Wear resistance | B | B | B | B | A | B | B | B | A | A | A |

TABLE 3

| | Example | | | Comparative Example | | | | | | | |
|---|---|---|---|---|---|---|---|---|---|---|---|
| | 12 | 13 | 14 | 1 | 2 | 3 | 4 | 5 | 6 | 7 | 8 |
| Polypropylene-based resin A | 30 | 30 | 30 | 50 | 10 | 40 | 25 | 35 | 35 | 25 | 35 |
| Polypropylene-based resin B | | | | | | | | | | | |
| Poly(phenylene ether) C | 45 | 45 | 45 | 25 | 60 | 45 | 40 | 40 | 40 | 50 | 35 |
| Poly(phenylene sulfide) D | | | | | | | | | | | |

TABLE 3-continued

| | Example | | | Comparative Example | | | | | | | |
|---|---|---|---|---|---|---|---|---|---|---|---|
| | 12 | 13 | 14 | 1 | 2 | 3 | 4 | 5 | 6 | 7 | 8 |
| Styrene-based elastomer E | | 12 | 17 | 25 | 30 | 15 | 35 | | | | 30 |
| Styrene-based elastomer F | | | | | | | | | | | |
| Styrene-based elastomer G | 13 | 13 | | | | | | | | 25 | |
| Styrene-based elastomer H | 12 | | | | | | | | | | |
| Styrene-based elastomer I | | | | | | | | | | | |
| Styrene-based elastomer J | | | | | | | | 25 | | | |
| Styrene-based elastomer K | | | | | | | | | 25 | | |
| Styrene-based elastomer L | | | 8 | | | | | | | | |
| Phosphorus-based flame retardant M | 15 | 15 | 15 | 15 | 10 | 15 | 15 | 15 | 15 | 4 | 25 |
| Phosphorus-based flame retardant N | | | | | | | | | | | |
| Property Heat aging resistance | B | A | B | A | C | C | A | C | C | A | A |
| Compatibility with PVC | B | B | B | B | B | C | B | B | B | B | B |
| Flame retardancy | B | B | B | C | B | B | B | B | B | C | B |
| Unsusceptibility to high-temperature melting | A | A | A | C | A | A | A | A | A | A | A |
| Hot-water resistance | B | B | B | B | B | B | B | B | B | B | C |
| Oil resistance | B | B | B | B | C | B | C | B | B | B | B |
| Flexibility | B | A | B | A | A | C | A | C | C | A | A |
| Wear resistance | A | B | A | A | A | A | C | A | A | A | A |

<Production of Covered Electrical Wires>

The twenty-two resin compositions for heat-resistant electrical wires were used to obtain respective covered electrical wires.

Specifically, extrusion molding was conducted under the temperature conditions of 250° C. to coat a core wire having a diameter of 0.15 mm (i.e., a stranded wire composed of 19 filaments) so that the resultant covering layer had an outer diameter of 1.3 mm. Thus, twenty-two kinds of covered electrical wires were obtained.

<Evaluation of the Covered Electrical Wires>

Each of the covered electrical wires obtained was evaluated for heat aging resistance, compatibility with PVC, flame retardancy, unsusceptibility to high-temperature melting, hot-water resistance, oil resistance, flexibility, and wear resistance.

<<Heat Aging Resistance>>

The heat aging resistance of an automotive electrical wire is a measure of the mechanical properties which the electrical wire will have after 10-year service within an engine room or after 100,000-km travelling. When an electrical wire withstands a 125° C. environment for 10,000 hours, the durability thereof is considered to be sufficient. As an acceleration experiment therefor was conducted a heat aging resistance test at 150° C. for 900 hours.

After the test, the covered electrical wires were evaluated in the following manner. Each electrical wire was wound on a mandrel having the same diameter as the electrical wire, i.e., having a diameter of 1.3 mm. When the covering layer developed no crack upon the winding, the heat aging resistance of this electrical wire was considered to be high and was rated as "A". When an electrical wire was wound on a mandrel having a diameter as provided for in ISO-6722, i.e., on a mandrel having a diameter of 1.95 mm, and the covering layer thereof developed no crack, then the heat aging resistance of this electrical wire was considered to be sufficient and was rated as "B". When an electrical wire was wound around a mandrel having a diameter of 1.95 mm and the covering layer thereof cracked, then the heat aging resistance of this electrical wire was considered to be insufficient and was rated as "C".

<<Compatibility with PVC>>

Compatibility with PVC was evaluated as a measure of heat resistance which is required of automotive electrical wires that coexist with other members.

Two covered electrical wires obtained above were incorporated into an electrical-wire bundle composed of five PVC electrical wires which each had the same diameter as the covered electrical wires and had an insulating layer made of a vinyl chloride resin. This bundle was tied with a pressure-sensitive adhesive tape constituted of a vinyl chloride resin, and was then subjected to a heat treatment at 130° C. for 650 hours (these conditions are an acceleration test corresponding to 10,000-hour 100° C. heating). Thereafter, the covered electrical wires were wound on a mandrel of the same diameter. When the covering layer developed no crack upon the winding, the compatibility with PVC of this covered electrical wire was considered to be sufficient and was rated as "B". When the covering layer cracked, the compatibility with PVC of this covered electrical wire was considered to be insufficient and was rated as "C".

<<Flame Retardancy>>

In accordance with ISO-6722, the covered electrical wires were stretched obliquely to the vertical direction at an angle of 45° and a reducing flame was kept in contact with the electrical wires for 15 seconds. When the flame which had been caught by each electrical wire went out in 70 seconds, the flame retardancy of this covered electrical wire was considered to be sufficient even for automotive electrical wires and was rated as "B". When the flame which had been caught did not go out, the flame retardancy of this covered electrical wire was considered to be insufficient and was rated as "C".

<<Unsusceptibility to High-Temperature Melting>>

Unsusceptibility to high-temperature melting was evaluated as a measure of momentary heat resistance which is required of automotive electrical wires in engine rooms, in accordance with JASO-608.

The covered electrical wires obtained above each were wound around a mandrel of the same diameter, subsequently heated at 200° C. for 30 minutes, and then unwound and examined as to whether the covering layer had been fused to itself. When the covering layer had suffered no fusion, the unsusceptibility to high-temperature melting of this covered electrical wire was considered to be high and was rated as "A". When the covering layer had suffered no fusion through 180° C. heating for 30 minutes, then the unsusceptibility to high-temperature melting of this covered electrical wire was considered to be sufficient and was rated as "B". When the covering layer had been fused through 180° C. heating for 30 minutes, then the unsusceptibility to high-temperature melting of this covered electrical wire was considered to be insufficient and was rated as "C".

<<Hot-Water Resistance>>

Hot-water resistance was evaluated as a measure of hydrolytic resistance which is required of automotive electrical wires in engine rooms, in accordance with ISO-6722.

The covered electrical wires obtained above each were immersed in an 85° C. aqueous sodium chloride solution (sodium chloride concentration, 10 g/L) for 5 weeks. Thereafter, each covered electrical wire was examined for insulation resistance with a resistance meter having a DC voltage of 500 V. When the covered electrical wire had an electrical resistance of $10^9$ Ω·cm or higher, the hot-water resistance thereof was considered to be sufficient and was rated as "B". When the covered electrical wire had an electrical resistance lower than $10^9$ Ω·cm, the hot-water resistance thereof was considered to be insufficient and was rated as "C".

<<Oil Resistance>>

Oil resistance was evaluated as one measure of resistance to liquids which is required of automotive electrical wires, in accordance with ISO-6722.

Under the temperature conditions of 23° C., the covered electrical wires obtained above each were cut into a length of 600 mm, immersed in gasoline for 20 hours, and then wound around a mandrel of the same diameter. Thereafter, a voltage of 1 kV was applied thereto. When the covering layer withstood the voltage for 1 minute, the oil resistance thereof was considered to be sufficient and was rated as "B". When the covering layer was unable to withstand the voltage, the oil resistance thereof was considered to be insufficient and was rated as "C".

<<Flexibility>>

Flexibility was evaluated as a measure of applicability to motor vehicles which is required of automotive electrical wires.

The resin compositions obtained above for use in forming the covering layers of electrical wires each was used to produce a sheet having a thickness of 2 mm by pressing. This sheet was examined for JIS D hardness. When the hardness of the sheet was less than 60, this sheet was considered to have high flexibility and was rated as "A". When the hardness of the sheet was 60 or more but less than 65, this sheet was considered to have sufficient flexibility and was rated as "B". When the hardness of the sheet was 65 or more, this sheet was considered to have insufficient flexibility and was rated as "C".

<<Wear Resistance>>

Wear resistance was evaluated as a measure of resistance to wear through friction with other members (scrape characteristics) which is required of automotive electrical wires, in accordance with ISO-6722.

The electrical wires obtained above each were cut into a length of 1 m. A piano wire having a diameter of 0.25 mm on which a load of 7 N was kept being imposed was rubbed against the electrical wire over a rubbing range of 15.5 mm. When the electrical wire developed no insulation failure even through at least 150 cycles of the rubbing, this electrical wire was considered to have high wear resistance and was rated as "A". When the electrical wire developed no insulation failure even through at least 100 cycles of the rubbing, this electrical wire was considered to have sufficient wear resistance and was rated as "B". When the electrical wire developed an insulation failure through less than 100 cycles of the rubbing, this electrical wire was considered to have insufficient wear resistance and was rated as "C".

Those results of the evaluation are summarized in Table 2 and Table 3. It can be seen from the tables that covered electrical wires which are excellent in terms of the evaluation of all of heat aging resistance, compatibility with PVC, flame retardancy, unsusceptibility to high-temperature melting, hot-water resistance, oil resistance, flexibility, and wear resistance are obtained using the resin compositions for heat-resistant electrical wires according to the invention.

This application is based on a Japanese patent application filed on Apr. 13, 2009 (Application No. 2009-096808) and a Japanese patent application filed on Feb. 19, 2010 (Application No. 2010-034618), the contents thereof being incorporated herein by reference.

INDUSTRIAL APPLICABILITY

The resin composition for heat-resistant electrical wires according to the invention has high heat resistance and flame retardancy and combines excellent heat aging resistance and compatibility with PVC. This resin composition hence can be effectively utilized as an insulator material for heat-resistant low-voltage electrical wires for motor vehicles.

The invention claimed is:

1. A resin composition for heat-resistant electrical wires which is characterized by being configured of 100 parts by weight of base resin ingredients and 5-20 parts by weight of a phosphorus-based flame retardant, the base resin ingredients comprising 30-55 parts by weight of a polymer having a glass transition temperature or melting point of 180° C. or higher, 15-49 parts by weight of a polyolefin, and 21-30 parts by weight of a styrene-based elastomer ingredient, the styrene-based elastomer ingredient having a content of the styrene unit represented by chemical formula (I) of 30% by weight or less

[Chem. 1]

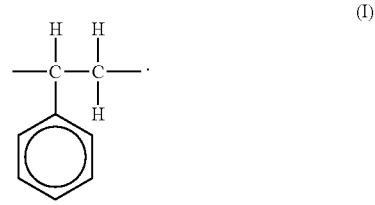

2. The resin composition for heat-resistant electrical wires as claimed in claim 1 wherein the polymer having a glass transition temperature or melting point of 180° C. or higher is poly(phenylene ether).

3. The resin composition for heat-resistant electrical wires as claimed in claim 1 wherein the polyolefin is a polypropylene-based polymer having a tensile modulus of 1,000 MPa or more.

4. The resin composition for heat-resistant electrical wires as claimed in claim 1 wherein the phosphorus-based flame retardant is a polyphosphoric acid salt.

5. The resin composition for heat-resistant electrical wires as claimed in claim 1 wherein the styrene-based elastomer ingredient is configured of a first styrene-based elastomer and a second styrene-based elastomer, the first styrene-based elastomer having a content of the styrene unit represented by chemical formula (I) of 13% by weight or less and the second styrene-based elastomer having a content of the styrene unit represented by chemical formula (I) of 29-43% by weight.

6. A heat-resistant electrical wire characterized by including a covering layer formed from the resin composition for heat-resistant electrical wires according to any one of claims 1 to 5.

* * * * *